US009177365B2

(12) United States Patent
Lim et al.

(10) Patent No.: US 9,177,365 B2
(45) Date of Patent: Nov. 3, 2015

(54) METHOD AND APPARATUS FOR DETECTING AND REMOVING FALSE CONTOUR, METHOD AND APPARATUS FOR VERIFYING WHETHER PIXEL IN INCLUDED IN CONTOUR, AND METHOD AND APPARATUS FOR CALCULATING SIMPLICITY

(75) Inventors: Il Soon Lim, Hongseong-gun (KR); Seung Sin Lee, Yongin-si (KR); Young Ran Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 11/966,218

(22) Filed: Dec. 28, 2007

(65) Prior Publication Data
US 2009/0060375 A1 Mar. 5, 2009

(30) Foreign Application Priority Data

Aug. 28, 2007 (KR) ........................ 10-2007-0086739

(51) Int. Cl.
*G06T 5/00* (2006.01)
*G06T 7/00* (2006.01)
(Continued)

(52) U.S. Cl.
CPC . *G06T 5/002* (2013.01); *G06T 5/20* (2013.01); *G06T 7/0085* (2013.01);
(Continued)

(58) Field of Classification Search
CPC .............................................. H04N 19/00915
USPC ................. 382/173, 181, 190–191, 195, 199, 382/205–206, 224, 232–233, 251, 254–255, 382/260–264, 266, 268, 274–275; 348/207.99, 606–607, 612, 625
See application file for complete search history.

(56) References Cited

U.S. PATENT DOCUMENTS 5,204,920 A * 4/1993 Moran et al. .................. 382/166
5,218,649 A * 6/1993 Kundu et al. ................. 382/180
(Continued)

FOREIGN PATENT DOCUMENTS

CN 1190824 8/1998
CN 1643544 7/2005
(Continued)

OTHER PUBLICATIONS

J. W. Lee et al., "Two-stage false contour detection using directional contrast and its application to adaptive false contour reduction," IEEE Trans. Consum. Electron., vol. 52, No. 1, pp. 179-188, Feb. 2006.*
(Continued)

*Primary Examiner* — Kim Vu
*Assistant Examiner* — Nathan Bloom
(74) *Attorney, Agent, or Firm* — NSIP Law

(57) ABSTRACT

A method and an apparatus for detecting and removing a false contour, a method and an apparatus for verifying whether a pixel is included in a contour, and a method and an apparatus for calculating simplicity are provided. The method for detecting and removing the false contour includes: verifying whether a pixel of an input video is included in a contour; calculating simplicity of the pixel; determining whether the pixel is included in a false contour based on the simplicity and based on whether the pixel is included in the contour; and removing the false contour from the input video via smoothing with respect to the false contour.

15 Claims, 12 Drawing Sheets

(51) Int. Cl.
  *G06T 5/20* (2006.01)
  *H04N 19/176* (2014.01)
  *H04N 19/60* (2014.01)
  *H04N 19/61* (2014.01)
  *H04N 19/117* (2014.01)
  *H04N 19/80* (2014.01)
  *H04N 19/86* (2014.01)
  *H04N 19/14* (2014.01)
  *H04N 19/182* (2014.01)

(52) U.S. Cl.
  CPC ............ *H04N 19/117* (2014.11); *H04N 19/14* (2014.11); *H04N 19/176* (2014.11); *H04N 19/182* (2014.11); *H04N 19/60* (2014.11); *H04N 19/61* (2014.11); *H04N 19/80* (2014.11); *H04N 19/86* (2014.11); *G06T 2207/10024* (2013.01); *G06T 2207/20012* (2013.01); *G06T 2207/20192* (2013.01)

(56) References Cited

U.S. PATENT DOCUMENTS

| | | | |
|---|---|---|---|
| 5,850,294 A * | 12/1998 | Apostolopoulos et al. | 358/426.14 |
| 6,259,823 B1 * | 7/2001 | Lee et al. | 382/268 |
| 6,999,630 B1 * | 2/2006 | Drouot | 382/262 |
| 2004/0136565 A1 * | 7/2004 | Hannigan et al. | 382/100 |
| 2005/0135694 A1 * | 6/2005 | Daly | 382/254 |
| 2005/0163395 A1 * | 7/2005 | Gesnot | 382/268 |
| 2006/0050783 A1 * | 3/2006 | Le Dinh et al. | 375/240.2 |
| 2006/0269159 A1 * | 11/2006 | Kim et al. | 382/256 |
| 2010/0066912 A1 * | 3/2010 | Kumwilaisak et al. | 348/607 |

FOREIGN PATENT DOCUMENTS

| | | |
|---|---|---|
| JP | 2000-004381 | 1/2000 |
| JP | 2005-137936 | 6/2005 |
| JP | 2007-011939 | 1/2007 |
| KR | 10-2004-0111436 | 12/2004 |

OTHER PUBLICATIONS

Gregory Joy, Zhigang Xiang, Reducing false contours in quantized color images, Computers & Graphics, vol. 20, Issue 2, Mar.-Apr. 1996, pp. 231-242.*

Office Action, mailed Jan. 29, 2010, in corresponding Chinese Application No. 2008100804229 (6 pp.).

Office Action, mailed Jul. 19, 2010, in corresponding Chinese Application No. 2008100804229 (5 pp.).

Japanese Office Action issued Feb. 19, 2013 in the corresponding Japanese Patent Application No. 2008-117683.

Korean Office Action issued Apr. 19, 2013 in corresponding Korean Application No. 10-2007-0086739.

* cited by examiner

FIG. 5
501
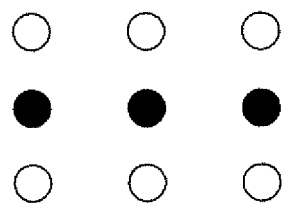
502
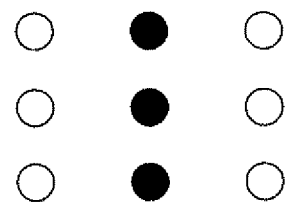
503
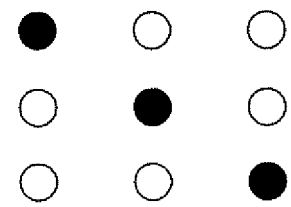
504
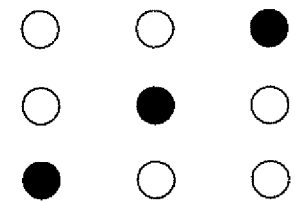

FIG. 6
601
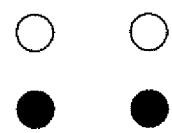
602
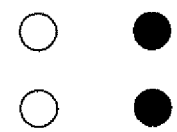
603
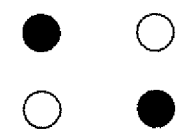
604
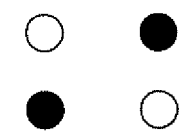

FIG. 8
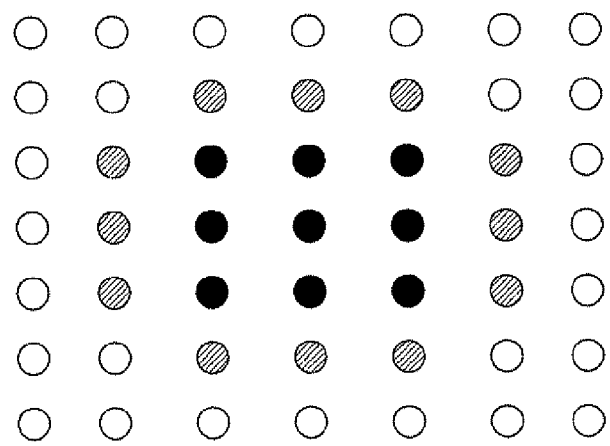
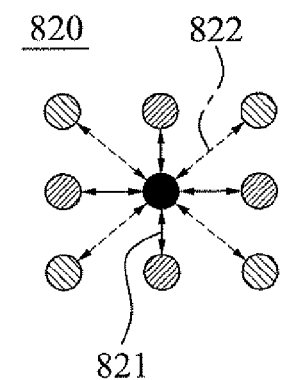
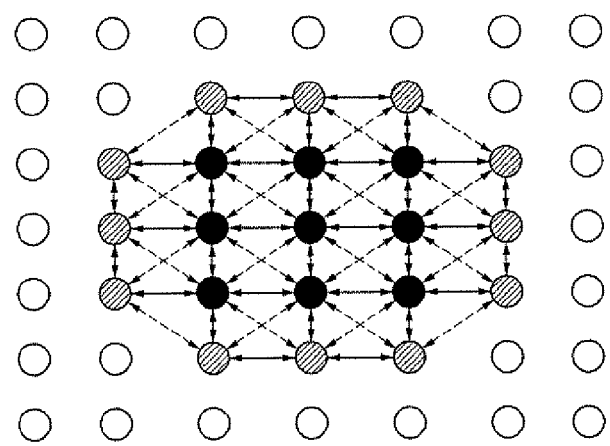

METHOD AND APPARATUS FOR DETECTING AND REMOVING FALSE CONTOUR, METHOD AND APPARATUS FOR VERIFYING WHETHER PIXEL IN INCLUDED IN CONTOUR, AND METHOD AND APPARATUS FOR CALCULATING SIMPLICITY

CROSS-REFERENCE TO RELATED APPLICATION

This application claims the benefit of Korean Patent Application No. 2007-86739, filed on Aug. 28, 2007 in the Korean Intellectual Property Office, the disclosure of which is incorporated herein by reference.

BACKGROUND OF THE INVENTION

1. Field of the Invention

Aspects of the present invention relate to a method and an apparatus for detecting and removing a false contour. The apparatus for detecting and removing the false contour can be applied to all devices obtaining, storing, or displaying a digital video, such as a digital multimedia broadcasting (DMB) player, a mobile communication terminal, a digital camera, a camera phone, a digital television (TV), and the like.

2. Description of the Related Art

There are many causes for occurrence of a false contour, however the false contour generally occurs when a quantization level is not sufficient. In this case, the quantization level indicates a brightness level. The quantization level is determined depending on a bit depth. As an example, although a false contour does not occur at an original bit depth, but when a video is converted, the false contour occurs at a lower bit depth. Also, the false contour occurs when the video is restored to the original bit depth. The false contour occurs when a video is compressed or restored, such as joint photographic experts groups (JPEG), and moving picture experts groups (MPEG), and the false contour also occurs in the case of contrast enhancement (CE) and detail enhancement (DE).

There are a blue noise mask method, a dithering method, and a Daly and Feng method as conventional methods for removing a false contour.

If a bit depth of an input video is less than a bit depth of an output video, the dithering method increases a bit depth as a result of an ordered matrix. However, the dithering method has a problem in that, an artificial pattern occurs in an entire video. Also, in the Daly and Feng method, a false contour is removed using a low pass filter (LPF) with respect to a video which has the false contour. The Daly and Feng method has a problem in that, a portion including the false contour is smoothed, and also a signal element which is identical to a real edge is blurred since the LPF is used with respect to an entire video. To solve the above mentioned problem, it is important to precisely find out a portion including the false contour.

SUMMARY OF THE INVENTION

Aspects of the present invention provide a method for detecting and removing a false contour which can protect a detail area since the false contour is detected from an input video in advance, and the false contour is selectively removed by limiting the removal to only the false contour, and a display apparatus.

The present invention also provides a method for detecting and removing a false contour which can precisely detect and remove the false contour since the false contour, occurring when an input video of a lower bit depth is extended to an output video of a higher bit depth, is detected, and smoothing is performed with respect to the detected false contour, and a display apparatus.

The present invention also provides a method for detecting and removing a false contour which can improve accuracy when detecting a false contour by using a gradient and simplicity and can perform adaptive smoothing by recycling the gradient and the simplicity when detecting the false contour from an input video, and a display apparatus.

The present invention also provides a method for detecting and removing a false contour which can be effectively applied to a small-sized display such as a digital multimedia broadcasting (DMB) player and a mobile phone, which require a smaller memory capacity and less complex calculations, since a gradient and simplicity between adjacent pixels are obtained via a simple arithmetical operation ((사칙연산),), and a result of smoothing is obtained via another simple arithmetical operation ((사칙연산),), and a display apparatus.

According to an embodiment of the present invention, there is provided a method for detecting and removing a false contour including: verifying whether a pixel of an input video is included in a contour; calculating simplicity of the pixel; determining whether the pixel is included in a false contour based on the simplicity and based on whether the pixel is included in the contour; and removing the false contour from the input video via smoothing with respect to the false contour.

In an aspect of the present invention, the verifying of whether the pixel of the input video is included in the contour may include: calculating a gradient of each pixel; and determining whether the pixel is included in the contour based on the gradient. In this instance, the determining of whether the pixel is included in the contour based on the gradient may determine the pixel is included in the contour when the gradient of the pixel is identical to a longitudinal value or a diagonal value according to a number of a bit loss.

In an aspect of the present invention, the verifying of whether the pixel of the input video is included in the contour may further include verifying whether a linked pixel to the pixel exists, and the determining of whether the pixel is included in the contour based on the gradient may determine the pixel is included in the contour when the gradient of the pixel is identical to the longitudinal value or identical to the diagonal value according to the number of a bit loss and when the linked pixel exists.

In an aspect of the present invention, the calculating of the simplicity of the pixel may include: verifying whether a difference between adjacent pixels within an n×n sized pixel group, including the pixel in a center thereof, is less than a predetermined difference; measuring a bond strength between the adjacent pixels according to directions of the adjacent pixels when the difference between the adjacent pixels is less than the predetermined difference; and calculating the simplicity of the pixel based on the bond strength.

In an aspect of the present invention, the removing of the false contour from the input video via smoothing with respect to the false contour may include: determining a smoothing level based on simplicity and a gradient of the pixel and based on simplicity and a gradient of an adjacent pixel; and removing the false contour according to the smoothing level.

According to an embodiment of the present invention, there is provided a method for determining whether a pixel is included in a contour including: calculating a gradient of each pixel of an input video; verifying whether a linked pixel to the pixel exists, and determining whether the pixel is included in the contour based on the gradient and based on whether the linked pixel to the pixel exists.

According to an embodiment of the present invention, there is provided a method for calculating simplicity of a pixel included in an input video including: verifying whether a difference between adjacent pixels within an n×n sized pixel group, including the pixel in a center thereof, is less than a predetermined difference; measuring a bond strength between the adjacent pixels according to directions of the adjacent pixels when the difference between adjacent pixels is less than the predetermined difference; and calculating the simplicity of the pixel based on the bond strength.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a diagram illustrating a method for verifying whether a linked pixel to a predetermined pixel exists by using a 3×3 sized pattern according to an embodiment of the present invention;

FIG. 6 is a diagram illustrating a method for verifying whether a linked pixel to a predetermined pixel exists by using a 2×2 sized pattern according to an embodiment of the present invention;

FIG. 8 is a diagram illustrating an example of a method for calculating simplicity according to an embodiment of the present invention;

DETAILED DESCRIPTION OF EMBODIMENTS

Figure 1:
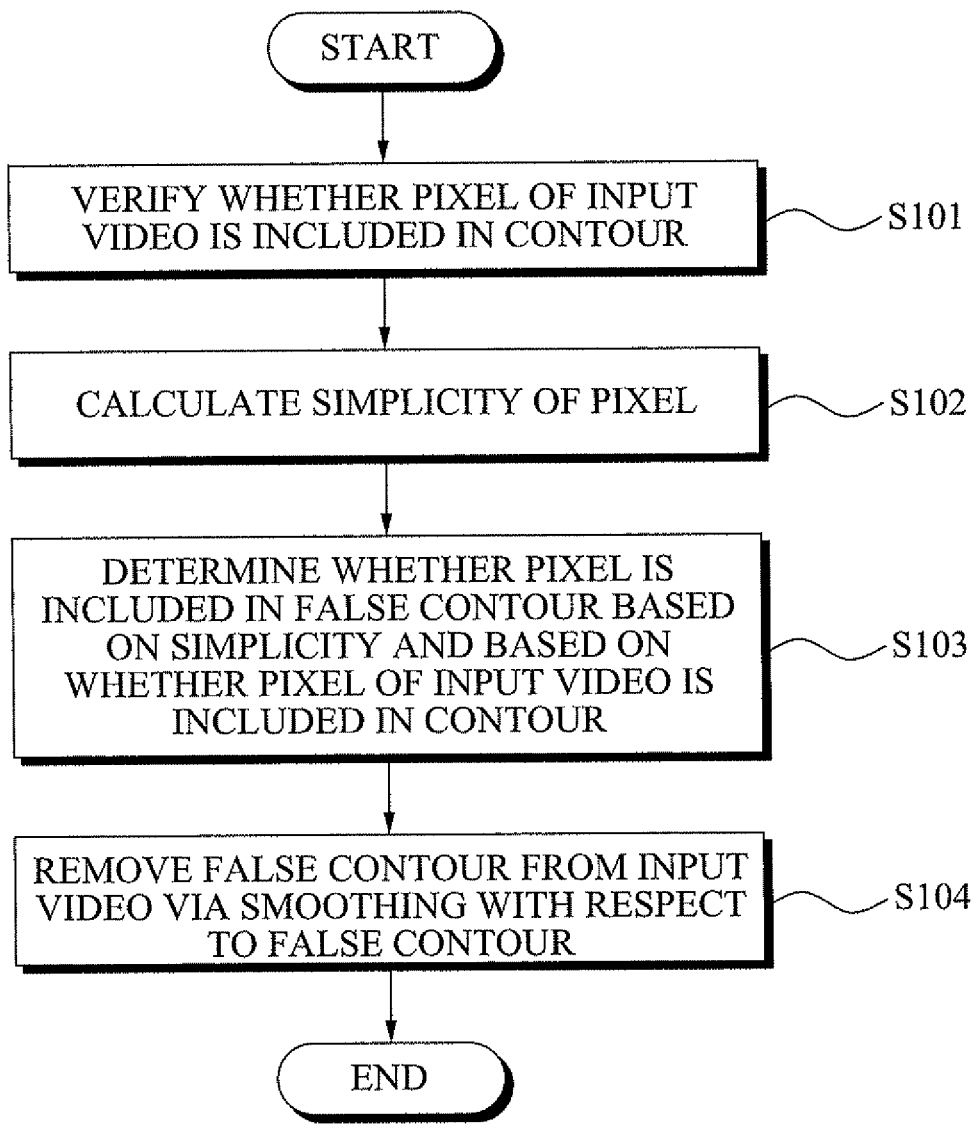
FIG. 1 is a flowchart illustrating a method for detecting and removing a false contour according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

The present invention relates to a method for detecting and removing a false contour of a video, and to an apparatus adopting the method, and more particularly, to a method for detecting a false contour which occurs due to restoration of a video which has lost bits or due to extension of a bit depth. As an example, when an input video whose bit depth of a red green blue (RGB) being 8/8/8 bits loses its lower 2 bits, which results in a 6/6/6 bit video, a false contour occurs in an output video due to a lack of bits. In this instance, according to the method for detecting the false contour of the present invention, the false contour, which occurs when restoring the 6/6/6 bit video to the original 8/8/8 bit video, can be detected and removed. Also, according to the present invention, in addition to the case that a false contour has occurred due to restoration of a bit loss, a false contour can be detected and removed in the case that a false contour has occurred due to extension of a video.

FIG. 1 is a flowchart illustrating a method for detecting and removing a false contour according to an embodiment of the present invention.

In operation S101, an apparatus for detecting and removing a false contour verifies whether a pixel of an input video is included in a contour. As described from the above, it may be verified whether each pixel of an input video is included in a contour in order to restore a video where a false contour has occurred due to extension of a bit depth or due to a bit loss. A method for verifying whether each pixel of the input video is included in the contour will be described later by referring to FIGS. 2 through 6.

In operation S102, the apparatus for detecting and removing the false contour calculates simplicity of the pixel. The simplicity with respect to a video denotes that details are less, and denotes being homogeneous, being smooth, and having a lot of low frequency elements. Also, the complex denotes having a lot of details and textures, being heterogeneous, having a lot of high frequency elements.

In a video, it is an unsolved problem to distinguish a detailed area, such as a complex image, from a smooth area, such as an area lacking detail. Conventionally, there is a method using a gradient map to distinguish the detailed area from the smooth area, however the conventional method is to distinguish an object from a boundary, but does not distinguish the detailed area and the smooth area.

Also, in Moving Pictures Experts Group (MPEG)-2, the detailed area is distinguished from the smooth area using variance. However, there is a case that the detailed area can not be distinguished from the smooth area using variance. That is, the simplicity is provided as a metric in the specification of the present invention to solve the problems of the conventional methods, and to be used for detecting the false contour.

A method for calculating the simplicity will be described later by referring to FIGS. 7 and 8.

In operation S103, the apparatus for detecting and removing the false contour determines whether the pixel is included in a false contour based on the simplicity and based on whether the pixel of the input video is included in the contour. In this instance, the apparatus for detecting and removing the false contour, from a plurality of pixels of the input video, may determine a pixel as the false contour, the pixel being included in the contour and whose simplicity is greater than a predetermined value. The method for determining whether the pixel is included in the false contour based on the simplicity and based on whether the pixel of the input video is included in the contour will be described later by referring to FIG. 9.

In operation S104, the apparatus for detecting and removing the false contour removes the false contour from the input video via smoothing with respect to the false contour. In this instance, the apparatus for detecting and removing the false contour determines a smoothing level based on simplicity and a gradient of the pixel, and based on simplicity and a gradient of an adjacent pixel. In this instance, to remove the false contour according to the smoothing level, the apparatus for detecting and removing the false contour may remove the false contour of the pixel and the adjacent pixel using a single smoothing filter, from predetermined smoothing filters, as shown in Equation 1, $$K_{7\times7} = \frac{1}{49} = \begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$ [Equation 1]

$$K_{5\times5} = \frac{1}{25} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

$$K_{3\times3} = \frac{1}{9} = \begin{bmatrix} 1 & 1 & 1 \\ 1 & 1 & 1 \\ 1 & 1 & 1 \end{bmatrix}$$

In this instance, Equation 1 is an example of smoothing filters which can be used in an embodiment of the present invention, and, although the present invention has been described in connection with a specific embodiment of the present invention, it is not limited thereto since it will be apparent to those skilled in the art that various substitutions, modifications and changes may be made thereto without departing from the scope and spirit of the invention. A method for removing the false contour using the smoothing filter will be described later by referring to FIG. 10.

Figure 2:
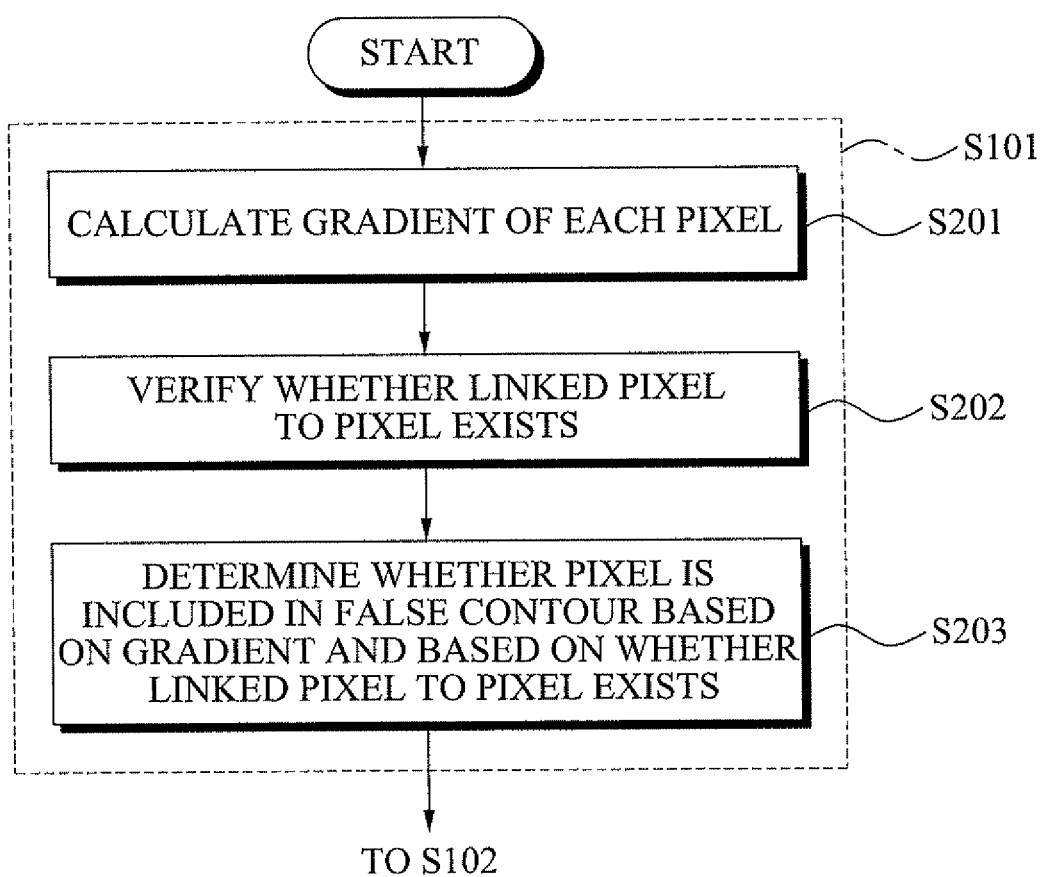
FIG. 2 is a flowchart illustrating a method for verifying whether a pixel is included in a contour according to an embodiment of the present invention.

FIG. 2 is a flowchart illustrating a method for verifying whether a pixel is included in a contour according to an embodiment of the present invention. As illustrated in FIG. 2, operations S201 through S203 may be performed by being included in operation S101 of FIG. 1.

In operation S201, an apparatus for detecting and removing a false contour calculates a gradient of each pixel. In this instance, the apparatus for detecting and removing the false contour may calculate the gradient using a nonlinear partial differential of an x axis and a nonlinear partial differential of a y axis, which correspond to a pixel of an input video, as below:

$$|G|=|Gx|+|Gy|,$$ [Equation 2]

where G indicates the gradient, Gx indicates the nonlinear partial differential of the x axis, and the Gy indicates the nonlinear partial differential of the y axis.

The nonlinear partial differential of the x axis and the nonlinear partial differential of the y axis, with respect to the input video, may be calculated using various masks to simplify various operations. As an example, the apparatus for detecting and removing the false contour may calculate the nonlinear partial differential of the x axis and the nonlinear partial differential of the y axis by applying a Sobel mask to a 3×3 sized pixel group, including the pixel in a center thereof. In this instance, the Sobel mask may include an x mask and a y mask shown in Equation 3, $$xMask = \begin{bmatrix} -1, & 0, & +1 \\ -2, & 0, & +2 \\ -1, & 0, & +1 \end{bmatrix},$$ [Equation 3]

$$yMask = \begin{bmatrix} +1, & +2, & +1 \\ 0, & 0, & 0 \\ -1, & -2, & -1 \end{bmatrix},$$

where xMask indicates a matrix expressing the x mask, and yMask indicates a matrix expressing the y mask.

That is, the apparatus for detecting and removing the false contour may respectively obtain the nonlinear partial differential of the x axis and the nonlinear partial differential of the y axis by multiplying the matrix expressing the x mask by the pixel group and by multiplying the matrix expressing the y mask by the pixel group, and may calculate the gradient of the pixel via Equation 2.

Also, to reduce complexity of the calculation of the nonlinear partial differential of the x axis and the nonlinear partial differential of the y axis, the apparatus for detecting and removing the false contour may calculate the nonlinear partial differential of the x axis and the nonlinear partial differential of the y axis by applying a gradient mask to a 2×2 sized pixel group, including the pixel in a predetermined location. In this instance, the gradient mask may include an x mask and a y mask shown in Equation 4, $$xGMask = \begin{bmatrix} 1, & -1 \\ 2, & -1 \end{bmatrix},$$ [Equation 4]

$$yGMask = \begin{bmatrix} -1, & -2 \\ 1, & 2 \end{bmatrix},$$

where xGMask indicates a matrix expressing the x mask, and yGMask indicates a matrix expressing the y mask. The gradient mask may be effectively applied to a small-sized display such as a digital multimedia broadcasting (DMB) player and a mobile phone, which require a smaller memory capacity and less complex calculations.

Figure 3:
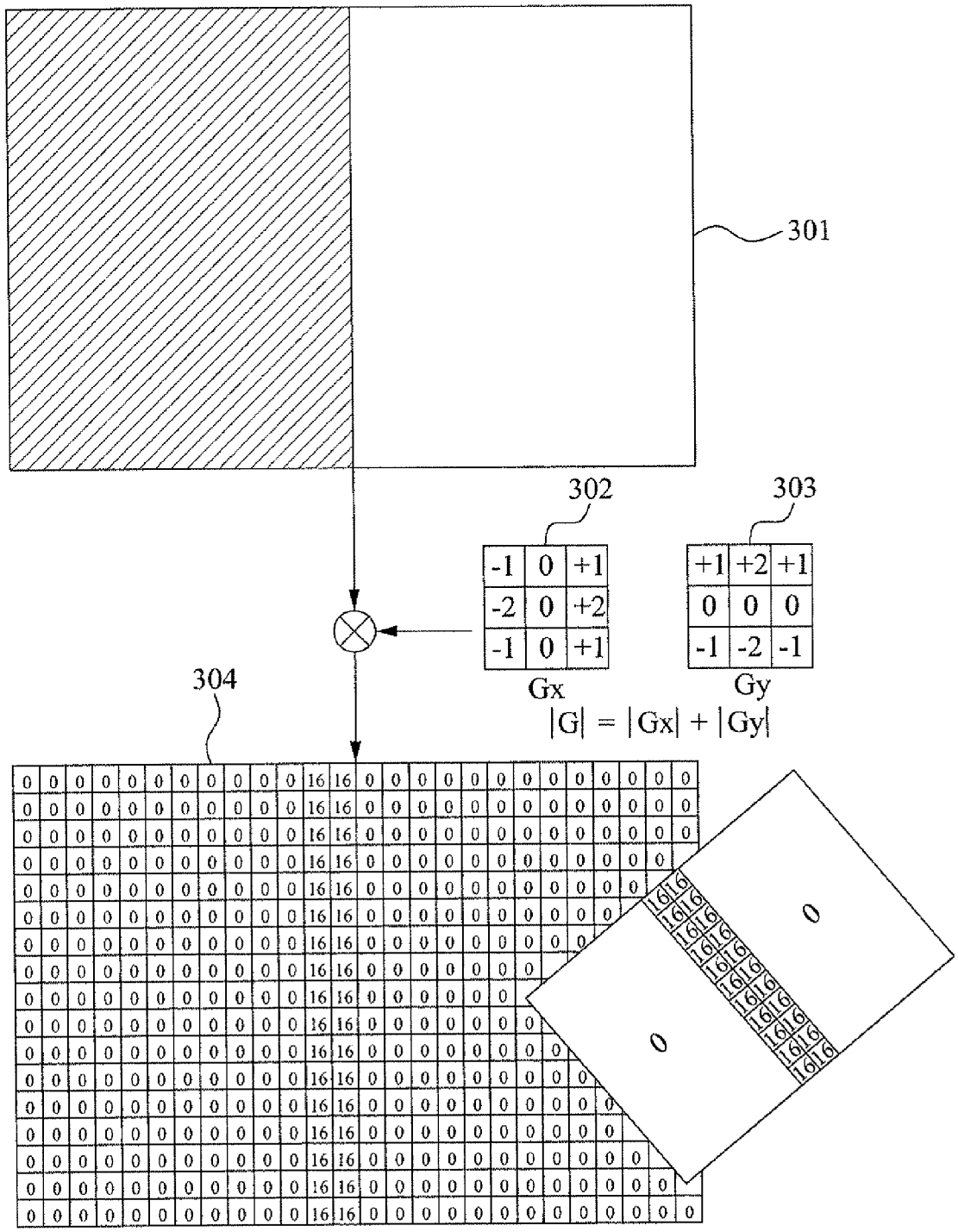
FIG. 3 is a diagram illustrating a method for calculating a longitudinal gradient of a pixel according to an embodiment of the present invention.
Figure 4:
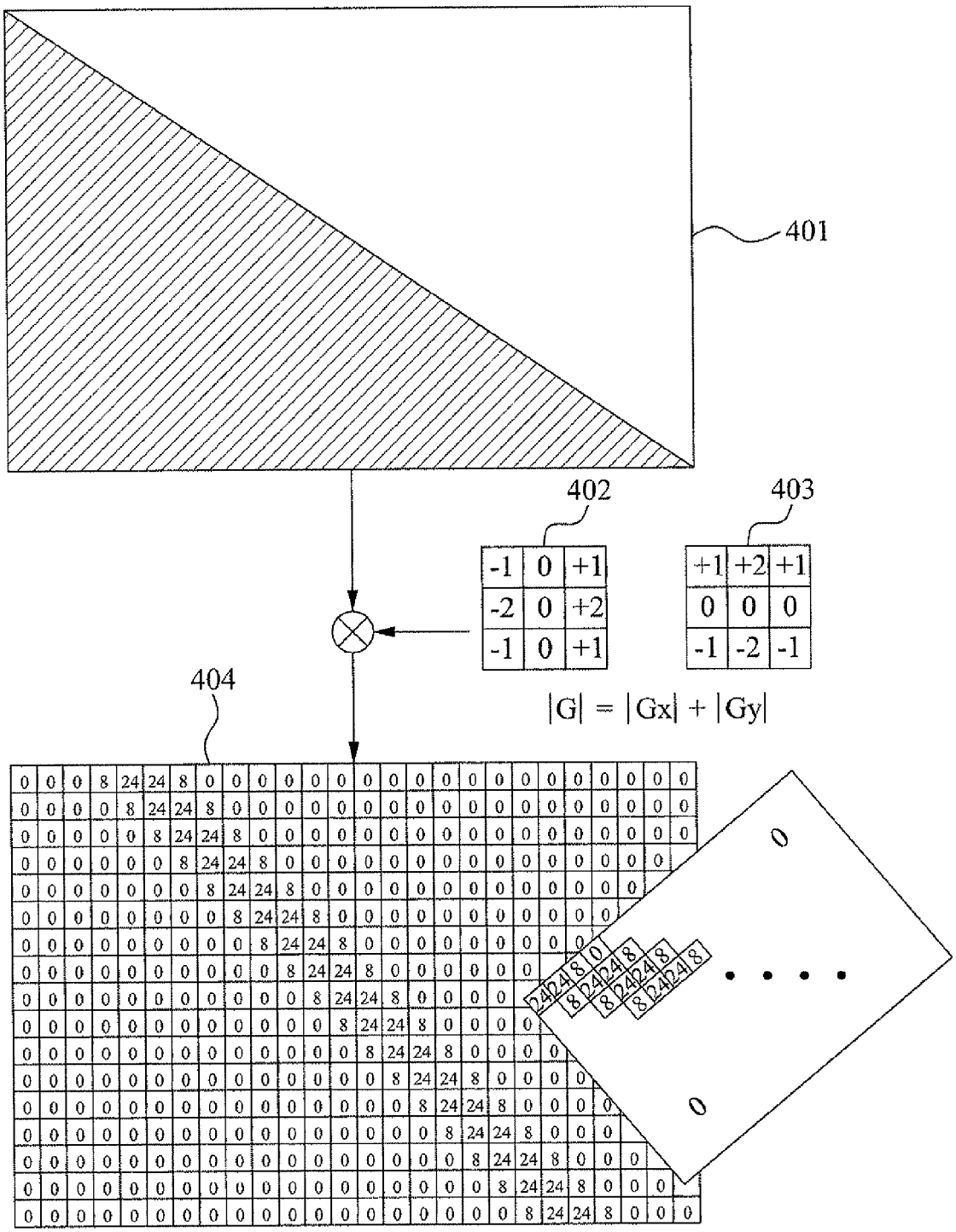
FIG. 4 is a diagram illustrating a method for calculating a diagonal gradient of a pixel according to an embodiment of the present invention.

FIG. 3 is a diagram illustrating a method for calculating a longitudinal gradient of a pixel, and FIG. 4 is a diagram illustrating a method for calculating a diagonal gradient of a pixel, according to an embodiment of the present invention. A gap of $2^2$ ($2^k$, k indicates a number of a bit loss) occurs due to a loss of lower 2 bits. The gap causes a false contour, and an area where the gap has occurred can be found using a gradient map. As an example, when a Sobel mask is used, a longitudinal gradient value occurring due to the loss of the lower 2 bits is 16, and a diagonal gradient value occurring due to the loss of the lower 2 bits is 24 and 8. That is, 16, 24, and 8 can be used to determine whether the pixel is included in the contour when the gradients are calculated using the Sobel mask.

In FIG. 3, with respect to an input area 301 including a false contour in a longitudinal direction, a nonlinear partial differential of an x axis and a nonlinear partial differential of a y axis are calculated with respect to the pixel by respectively applying the x mask 302 and the y mask 303, shown above in Equation 3, to a 3×3 sized pixel group, including the pixel in a center thereof, and a gradient is calculated using the nonlinear partial differential of the x axis, the nonlinear partial differential of the y axis, and Equation 2. As a result, a gradient map 304 consisting of 0 and 16 denoting a longitudinal false contour is illustrated in FIG. 3.

In FIG. 4, with respect to an input area 401 including a false contour in a diagonal direction, a nonlinear partial differential of an x axis and a nonlinear partial differential of a y axis are calculated with respect to the pixel by respectively applying the x mask 402 and the y mask 403, shown above in Equation 3, to a 3×3 sized pixel group, including the pixel in a center thereof, and a gradient is calculated using the nonlinear partial differential of the x axis, the nonlinear partial differential of the y axis, and Equation 2. As a result, a gradient map 404 consisting of 0, 24 and 8 denoting a diagonal false contour is illustrated in FIG. 4.

In operation S202, the apparatus for detecting and removing the false contour verifies whether a linked pixel to the pixel exists. In this instance, the apparatus for detecting and removing the false contour may verify whether the linked pixel to the pixel exists by using four patterns consisting of a 3×3 sized pixel group or four patterns consisting of a 2×2 sized pixel group. An isolated pixel can be removed by using the linked pixel when the linked pixel exists. That is, it is desirable to remove the isolated pixel since an artifact appearing in data becomes a visual artifact, which can be visible, when a plurality of pixels is linked.

FIG. 5 is a diagram illustrating a method for verifying whether a linked pixel to a predetermined pixel exists by using a 3×3 sized pattern, and FIG. 6 is a diagram illustrating a method for verifying whether a linked pixel to a predetermined pixel exists by using a 2×2 sized pattern, according to an embodiment of the present invention. An apparatus for detecting and removing a false contour may use a prescribed pattern to remove an isolated pixel, and a 3×3 sized pattern verifying a contour in a straight direction is illustrated in FIG. 5. Also, a 2×2 sized pattern verifying both a contour in a straight direction and a curved direction in FIG. 6.

In operation S203, the apparatus for detecting and removing the false contour determines whether the pixel is included in the contour based on the gradient. It may be determined whether the pixel is included in the contour by using the gradient and by using both the gradient and whether the linked pixel to the predetermined pixel exists.

When the gradient is exclusively used, the apparatus for detecting and removing the false contour may determine the pixel is included in a contour when the gradient of the pixel is identical to a longitudinal value or identical to a diagonal value according to a number of a bit loss. When both the gradient and whether the linked pixel to the predetermined pixel exists are used, a contour determination unit may determine the pixel is included in the contour when the gradient of the pixel is identical to a longitudinal value or identical to a diagonal value according to a number of a bit loss, and when the linked pixel exists.

Figure 7:
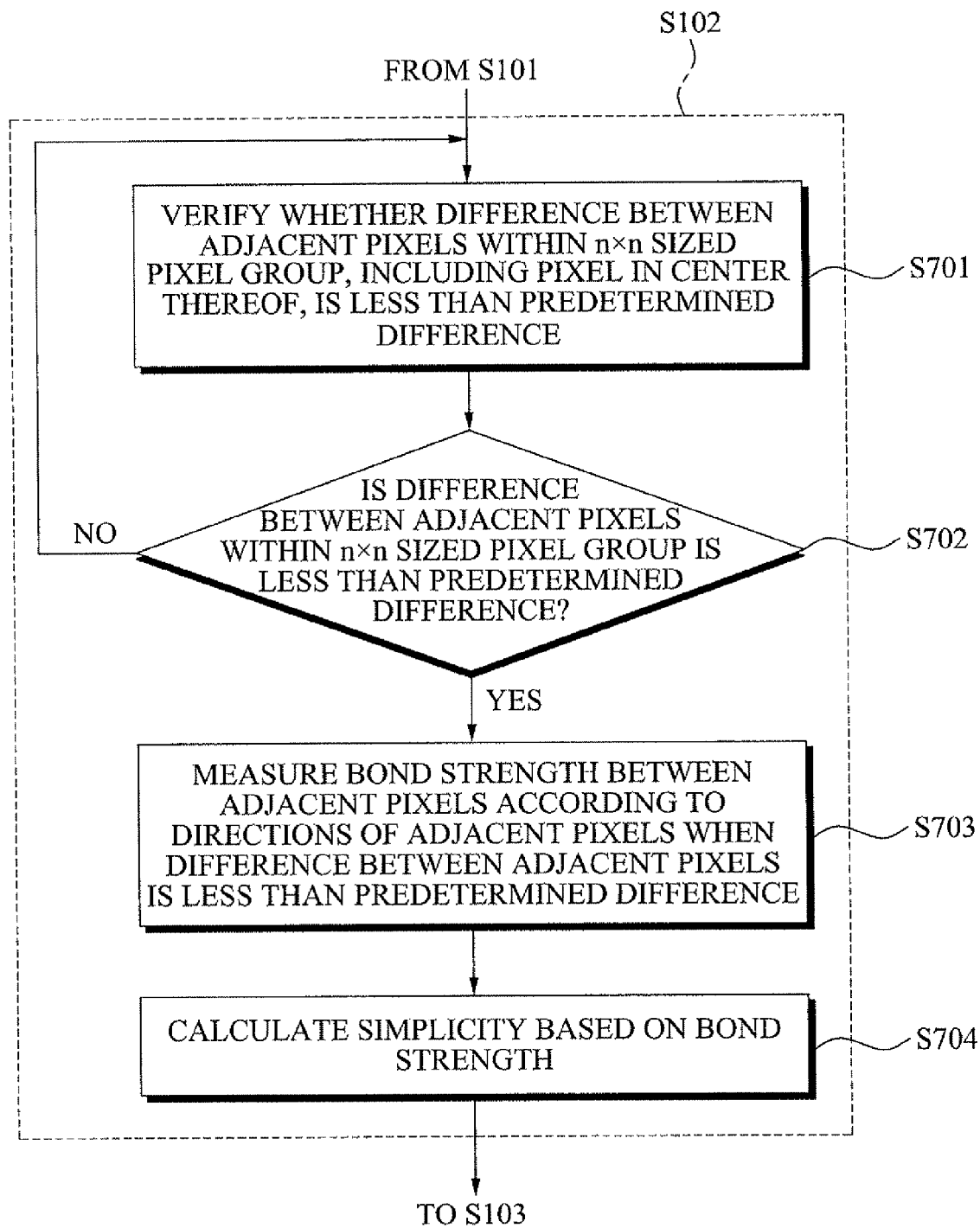
FIG. 7 is a flowchart illustrating a method for calculating simplicity of a pixel according to an embodiment of the present invention.

FIG. 7 is a flowchart illustrating a method for calculating simplicity of a pixel according to an embodiment of the present invention. As illustrated in FIG. 7, operations S701 through S704 may be performed by being included in operation S102 of FIG. 1.

In operation S701, an apparatus for detecting and removing a false contour verifies whether a difference between adjacent pixels within an n×n sized pixel group, including the pixel in a center thereof, is less than a predetermined difference. In this instance, the adjacent pixels may include a predetermined pixel within the n×n sized pixel group and a nearest pixel existing in a longitudinal direction and a diagonal direction from the predetermined pixel.

In operation S702, the apparatus for detecting and removing the false contour may perform a subsequent operation S703 when the difference between adjacent pixels within the n×n sized pixel group is less than the predetermined difference, or may perform operation S701 when the difference between adjacent pixels within the n×n sized pixel group is not less than the predetermined difference.

In operation S703, the apparatus for detecting and removing the false contour measures a bond strength between the adjacent pixels according to directions of the adjacent pixels when the difference between adjacent pixels is less than the predetermined difference. In this instance, the apparatus for detecting and removing the false contour may measure a prescribed weighted value according to either the longitudinal direction or the diagonal direction between the adjacent pixels as the bond strength. As an example, for the bond strength, a weighted value of 1 is measured with respect to a longitudinal direction, and a weighted value of 0.5 is measured with respect to a diagonal direction.

In operation S704, the apparatus for detecting and removing the false contour calculates simplicity based on the bond strength. In this instance, the apparatus for detecting and removing the false contour may determine a sum of bond strengths measured within the n×n sized pixel group as the simplicity of the pixel.

FIG. 8 is a diagram illustrating an example of a method for calculating simplicity according to an embodiment of the present invention.

The simplicity can be calculated using the sum of bond strengths as described above. The bond strength is a numerical value of a bond between a pixel and eight adjacent pixels around the pixel. When a pixel value in a center is identical to an adjacent pixel value in a longitudinal direction, a bond strength may be established as 1, and when a pixel value in a center is identical to an adjacent pixel value in a diagonal direction, a bond strength may be established as 0.5. That is, the adjacent pixel value in a diagonal direction can be established as 0.5, that is, less than the adjacent pixel value in a longitudinal direction, since it is well-known that a correlation between adjacent pixel values is in inverse proportion to a distance. Bond strengths are calculated with respect to all pixels within the n×n sized pixel group, that is with respect to a search window, and the sum of the bond strengths may be established as a value of simplicity of a pixel in a center of the n×n sized pixel group.

Referring to FIG. 8, a pixel within a 5×5 pixel group 810 and eight adjacent pixels 820 are illustrated. Solid bidirectional arrows 821 denoting a longitudinal direction indicates 1, and dotted bidirectional arrows 822 denoting a diagonal direction indicates 0.5. That is, when simplicity of a pixel in a center within a pixel group 830 consisting of 22 pixels, which are shown as bidirectional arrows with respect to all pixels in longitudinal directions and diagonal directions, is calculated, the simplicity is 46. In this instance, four corner pixels are excluded from 25 pixels corresponding to 5×5 sized pixel group 810 when calculated since the correlation is comparatively low.

The simplicity is calculated using a 5×5 sized pixel group in the embodiment of the present invention, and, although the present invention has been described in connection with a specific embodiment of the present invention, it is not limited thereto since it will be apparent to those skilled in the art that various substitutions, modifications and changes may be made thereto without departing from the scope and spirit of the invention. As an example, a 3×3 sized pixel group may be used instead of a 5×5 sized pixel group. That is, a 5×5 sized pixel group is preferable to obtain more precise simplicity, and a 3×3 sized pixel group is preferable to reduce complexity of calculation.

When a 5×5 sized pixel group as shown in FIG. 8 is used, maximum simplicity is 46, and minimum simplicity is 0 when intensities of all pixels in the pixel group are identical with each other. From a visual point, a greater simplicity denotes a periphery of a simpler corresponding pixel.

Although 1 and 0.5 are established as weighted values of the bond strengths in the embodiment of the present invention, variations such as 2 and 1, 4 and 2, and the like may be possible. Although the 3×3 sized pixel group and the 5×5 sized pixel group are used as search windows in the embodiment of the present invention, various search windows such as a 2×2 sized pixel group, a 7×7 sized pixel group, and the like can be used. Also, when a bond strength of a pixel is calculated, a longitudinal direction may be exclusively taken into consideration without considering both the longitudinal direction and a diagonal direction.

When a bond strength of a pixel is calculated, a bond strength is increased by 1 or 0.5 depending on whether the pixel is identical to an adjacent pixel, however other bond strength values may be added according to a difference between the pixel and the adjacent pixel. As an example, a bond strength may be increased by 4 when a difference between a pixel and an adjacent pixel is 0, a bond strength may be increased by 3 when a difference between a pixel and an adjacent pixel is 1, a bond strength may be increased by 2 when a difference between a pixel and an adjacent pixel is 2, and a bond strength may be increased by 1 when a difference between a pixel and an adjacent pixel is 3.

Figure 9:
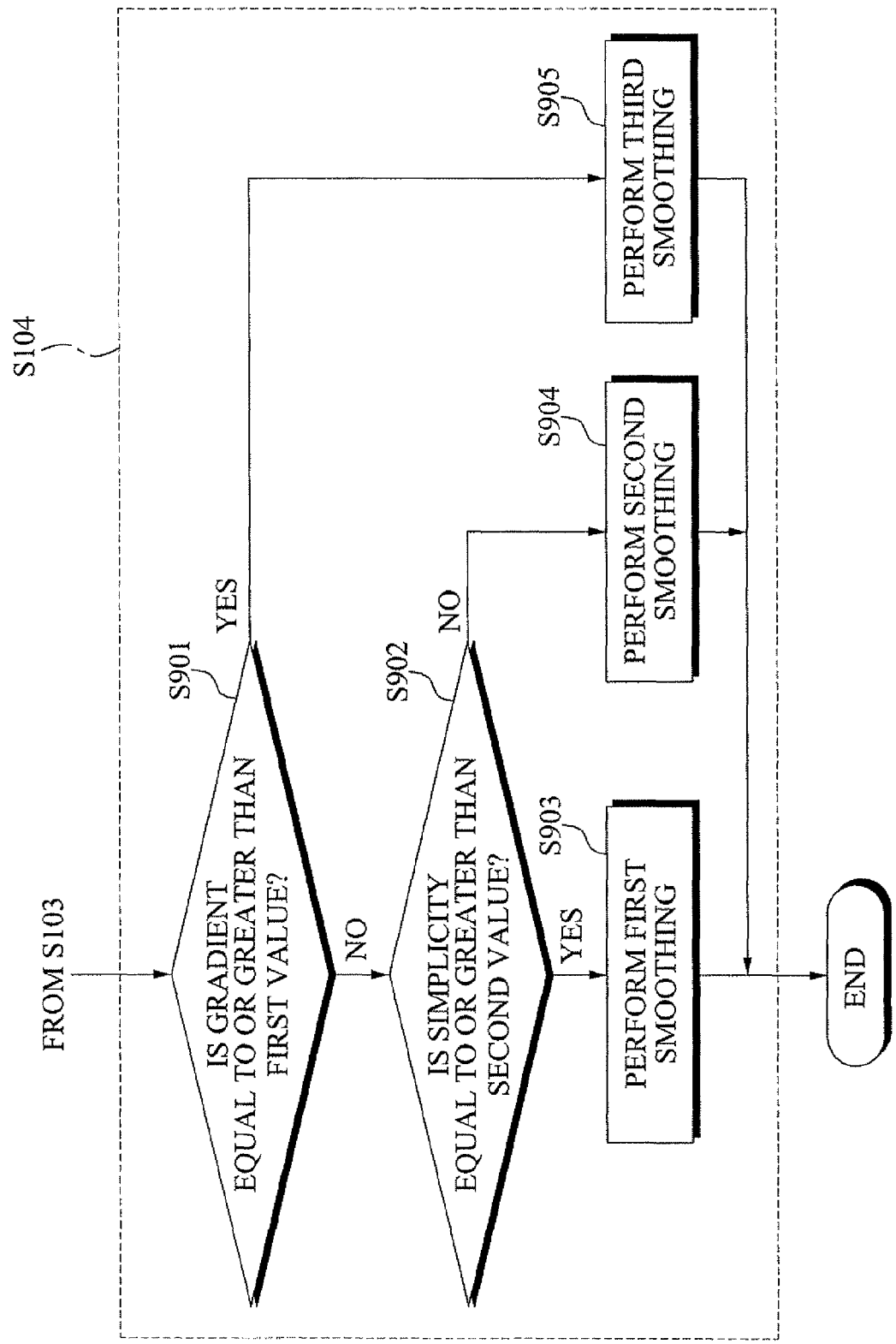
FIG. 9 is a flowchart illustrating a method for removing a false contour according to an embodiment of the present invention.

FIG. 9 is a flowchart illustrating a method for removing a false contour according to an embodiment of the present invention.

After it is verified whether each pixel is included in a false contour, and after a simplicity map is obtained, the false contour may be removed from an input video using a false contour map, a simplicity value, and a gradient. When the false contour is removed, a plurality of average smoothing filters may be used. As an example, average filters in various mask sizes may be used for smoothing filters as shown in Equation 1. A single average filter may be selected, from the average filters in various mask sizes, according to a gradient value and a simplicity value between a pixel and an adjacent pixel. When a predetermined pixel is determined as a false contour, and when smoothing is performed with respect to the predetermined pixel, it is determined whether a real edge element or a gradient value corresponding to a signal element exists.

In this instance, the real edge element or the signal element appears as a great gradient value. To protect the real edge element or the signal element, only slight smoothing is required to be performed when removing the false contour, accordingly a gentle smoothing filter may be selected.

Also, when a corresponding pixel is in a simple area, but a simplicity value is small, that is comparatively complex, a gentle smoothing filter may be used. As described above, the smoothing operation may be adaptively performed according to a gradient and simplicity value between a pixel and an adjacent pixel.

Operations S901 through S905 may be performed by being included in operation S104 of FIG. 1, and illustrate a method for removing a false contour.

In operation S901, an apparatus for detecting and removing a false contour may compare a gradient, with respect to a pixel and adjacent pixels, with a predetermined first value, may perform operation S902 when the gradient is less than the predetermined first value, and may perform operation S905 when the gradient is not less than the predetermined first value.

In operation S902, an apparatus for detecting and removing a false contour may compare simplicity, with respect to the pixel and adjacent pixels, with a predetermined second value, may perform operation S903 when the simplicity is equal to or greater than the predetermined second value, and may perform operation S904 when the simplicity is not equal to or greater than the predetermined second value.

The apparatus for detecting and removing the false contour may remove the false contour in operation S903, S904, and S905 since smoothing is performed with respect to the pixel and adjacent pixels by using a predetermined smoothing filter. That is, the false contour may be removed since a gentler smoothing filter is used as operations flow from operation S903 to operation S905.

Figure 10:
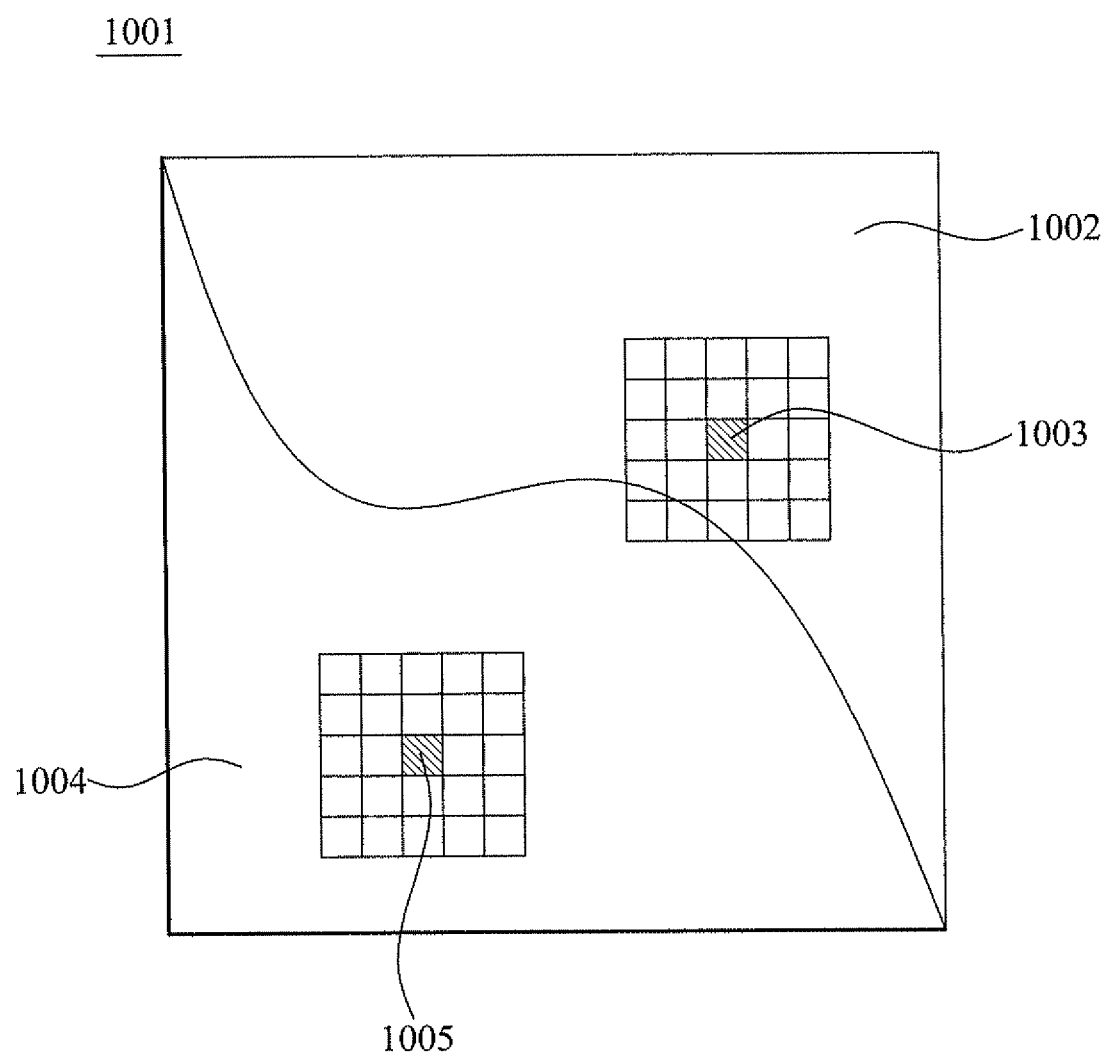
FIG. 10 is diagram illustrating an example of a method for applying a smoothing filter with respect to a false contour according to an embodiment of the present invention.

FIG. 10 is diagram illustrating an example of a method for applying a smoothing filter with respect to a false contour according to an embodiment of the present invention.

Smoothing is limitedly performed with respect to the false contour and a periphery of the false contour, and is not performed with respect to other areas, thereby protecting a detail area and a texture area.

That is, in an input video 1001, the smoothing filter is applied to a pixel 1003 in an area 1002 where the false contour has occurred, the smoothing filter is not applied to another pixel 1005 in another area 1004 where the false contour does not occur, thereby protecting the detail area and the texture area.

Figure 11:
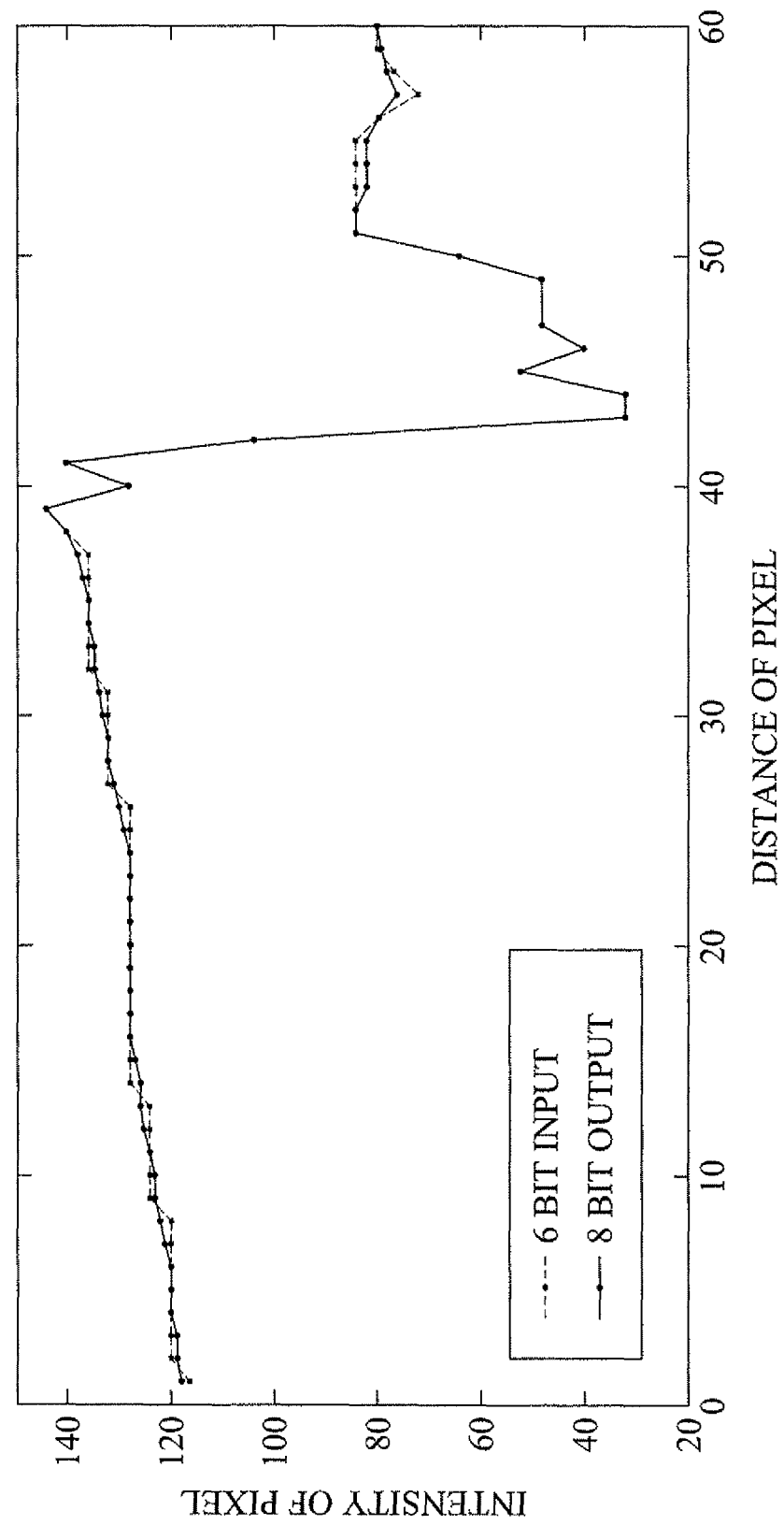
FIG. 11 is a graph illustrating a difference between an input video and an output video according to an embodiment of the present invention-delete.

FIG. 11 is a graph illustrating a difference between an input video and an output video according to an embodiment of the present invention.

A graph 1100 illustrates that a distance of a pixel to intensity of a pixel, and illustrates an input video of 6 bits and an output video of 8 bits. In an area where a false contour has occurred, a step graph turns into a ramp graph.

Figure 12:
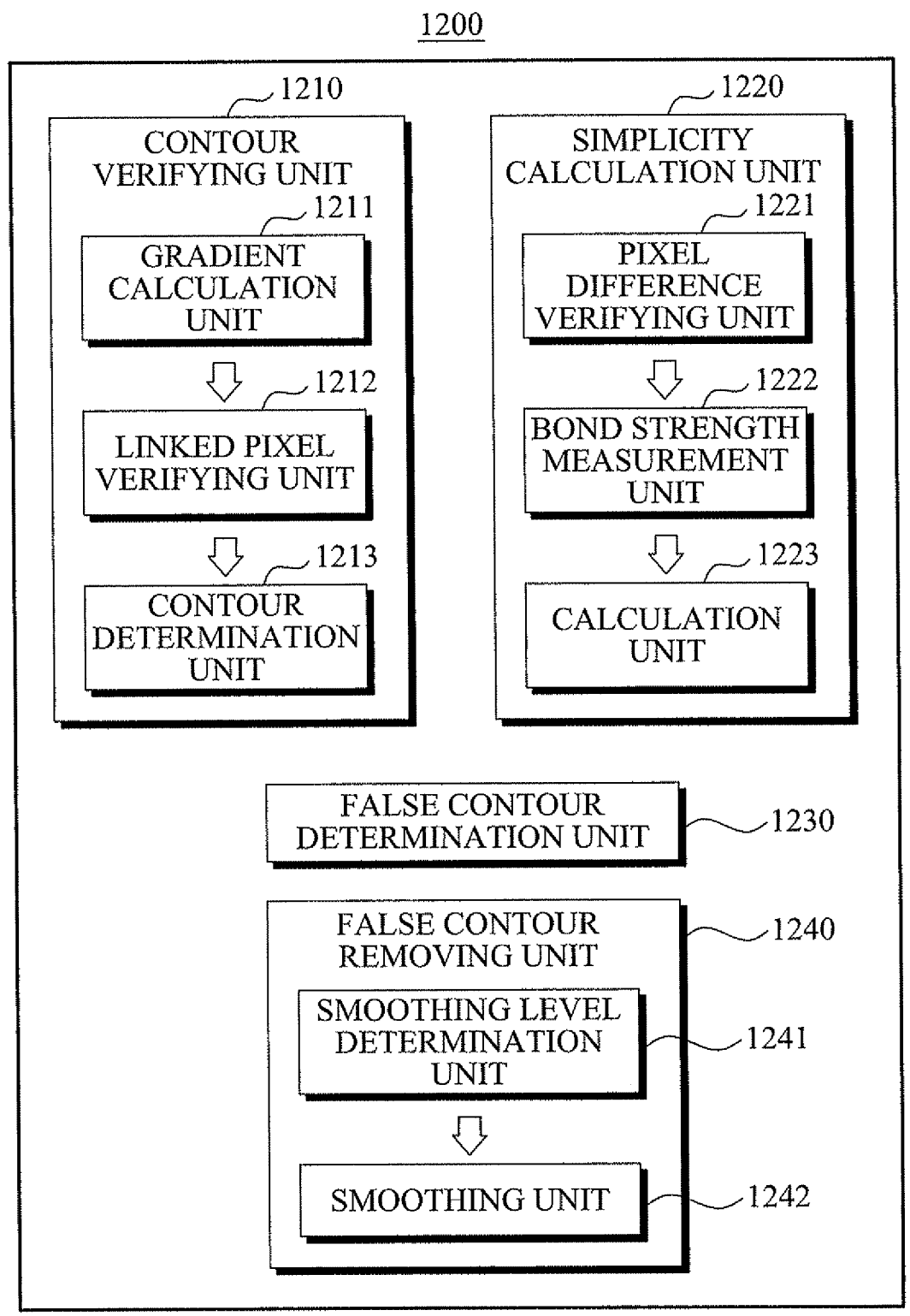
FIG. 12 is a block diagram illustrating an inner configuration of an apparatus for detecting and removing a false contour according to an embodiment of the present invention.

FIG. 12 is a block diagram illustrating an inner configuration of an apparatus 1200 for detecting and removing a false contour according to an embodiment of the present invention. As illustrated in FIG. 12, the apparatus 1200 for detecting and removing the false contour includes a contour verifying unit 1210, a simplicity calculation unit 1220, a false contour determination unit 1230, and a false contour removing unit 1240.

The contour verifying unit 1210 verifies whether a pixel of an input video is included in a contour. As described above, it may be verified whether each pixel of the input video is included in the contour in order to restore a video where a false contour has occurred due to extension of a bit depth or due to a bit loss. The contour verifying unit 1210 may include a gradient calculation unit 1211, a linked pixel verifying unit 1212, and a contour determination unit 1213, in order to verify the pixel is included in the contour.

The gradient calculation unit 1211 calculates a gradient of each pixel. In this instance, the gradient calculation unit 1211 of the apparatus 1200 for detecting and removing the false contour may calculate the gradient using a nonlinear partial differential of an x axis and a nonlinear partial differential of a y axis, which correspond to the pixel, as below:

$$|G|=|Gx|+|Gy|,$$  [Equation 2]

wherein G, Gx, and Gy are the same as described above.

The nonlinear partial differential of the x axis and the nonlinear partial differential of the y axis, with respect to the input video, may be calculated using various masks to simplify various operations. As an example, the gradient calculation unit 1211 of the apparatus 1200 for detecting and removing the false contour may calculate the nonlinear partial differential of the x axis and the nonlinear partial differential of the y axis by applying a Sobel mask to a 3×3 sized pixel group including the pixel in a center thereof. In this instance, the Sobel mask may include an x mask and a y mask shown above in Equation 3.

That is, the gradient calculation unit 1211 may respectively obtain the nonlinear partial differential of the x axis and the nonlinear partial differential of the y axis by multiplying the matrix expressing the x mask by the pixel group and by multiplying the matrix expressing the y mask by the pixel group, and may calculate the gradient of the pixel via Equation 2.

Also, to reduce complexity due to the calculation of the nonlinear partial differential of the x axis and the nonlinear partial differential of the y axis, the gradient calculation unit 1211 may calculate the nonlinear partial differential of the x axis and the nonlinear partial differential of the y axis by applying a gradient mask to a 2×2 sized pixel group, including the pixel in a predetermined location. In this instance, the gradient mask may include an x mask and a y mask shown in Equation 4. The gradient mask may be effectively applied to a small-sized display such as a DMB player and a mobile phone, which require a smaller memory capacity and less complex calculations.

The linked pixel verifying unit 1212 verifies whether a linked pixel to the pixel exists. In this instance, the linked pixel verifying unit 1212 of the apparatus 1200 for detecting and removing the false contour may verify whether the linked pixel to the pixel exists by using four patterns consisting of a 3×3 sized pixel group or four patterns consisting of a 2×2 sized pixel group. Whether the linked pixel to the pixel exists can be used to remove an isolated pixel. That is, it is desirable to remove the isolated pixel since an artifact appeared in a video becomes a visual artifact, which can be visible, when a plurality of pixels are linked.

The contour determination unit 1213 determines whether the pixel is included in the contour based on the gradient. In the contour determination unit 1213, it may be determined whether the pixel is included in the contour by using the gradient and by using both the gradient and whether the linked pixel to the predetermined pixel exists.

When the gradient is exclusively used, the contour determination unit 1213 may determine the pixel is included in a contour when the gradient of the pixel is identical to a longitudinal value or identical to a diagonal value according to a number of a bit loss. When both the gradient and whether the linked pixel to the predetermined pixel exists are used, the contour determination unit 1213 may determine the pixel is included in the contour when the gradient of the pixel is identical to a longitudinal value or identical to a diagonal value according to a number of a bit loss, and when the linked pixel exists.

The simplicity calculation unit 1220 calculates simplicity of the pixel. The simplicity with respect to a video denotes that details are less, and denotes being homogeneous, being smooth, and having many low frequency elements. Also, complexity denotes having many details and textures, being heterogeneous, and having many high frequency elements.

In a video, it is an unsolved problem to distinguish a detail area, such as a complex image, from a smooth area, such as an area lacking detail. Conventionally, there is a method using a gradient map to distinguish the detail area from the smooth area, however the conventional method is to distinguish an object from a boundary, but does not distinguish the detail area and the smooth area.

Also, in MPEG-2, the detailed area is distinguished from the smooth area using variance. However, there is a case that the detail area can not be distinguished from the smooth area using the variance. That is, the simplicity is provided as a metric in the specification of the present invention to solve the problems of the conventional methods, and to be used for detecting the false contour.

The simplicity calculation unit 1220 may include a pixel difference calculation unit 1221, a bond strength measurement unit 1222, and calculation unit 1223.

The pixel difference calculation unit 1221 verifies whether a difference between adjacent pixels within an n×n sized pixel group, including the pixel in a center thereof, is less than a predetermined difference. In this instance, the adjacent pixels may include a predetermined pixel within the n×n sized pixel group and a nearest pixel existing in a longitudinal direction and a diagonal direction from the predetermined pixel.

The bond strength measurement unit 1222 measures a bond strength between the adjacent pixels according to directions of the adjacent pixels when the difference between the adjacent pixels is less than the predetermined difference. In this instance, the bond strength measurement unit 1222 may measure a prescribed weighted value according to either the longitudinal direction or the diagonal direction between the adjacent pixels as the bond strength. As an example, for the bond strength, a weighted value of 1 is measured with respect to a longitudinal direction, and a weighted value of 0.5 is measured with respect to a diagonal direction.

The calculation unit 1223 calculates simplicity of the pixel based on the bond strength. In this instance, the calculation unit 1223 may determine a sum of bond strengths measured within the n×n sized pixel group as the simplicity of the pixel.

The false contour determination unit 1230 determines whether the pixel is included in the false contour. In this instance, the false contour determination unit 1230 for removing the false contour, from a plurality of pixels of the input video, may determine a pixel as the false contour, the pixel being included in the contour and whose simplicity is greater than a predetermined value.

The false contour removing unit 1240 removes the false contour from the input video via smoothing with respect to the false contour. In this instance, a smoothing level determination unit 1241 included in the false contour removing unit 1240 determines a smoothing level based on simplicity and a gradient of the pixel, and based on simplicity and a gradient of an adjacent pixel. In this instance, to remove the false contour according to the smoothing level, a smoothing unit 1242 included in the false contour removing unit 1240 may remove the false contour of the pixel and the adjacent pixel using a single smoothing filter, from predetermined smoothing filters, as shown in Equation 1.

In this instance, Equation 1 is an example of smoothing filters which can be used in an embodiment of the present invention, and, although the present invention has been described in connection with a specific embodiment of the present invention, it is not limited thereto since it will be apparent to those skilled in the art that various substitutions, modifications and changes may be made thereto without departing from the scope and spirit of the invention.

As described above, according to the method and apparatus for detecting and removing the false contour of the present invention, it is possible to protect a detail area since the false contour is detected from an input video in advance and the false contour is selectively removed by exclusively limiting the removal to only the false contour. Also, it is possible to precisely detect and remove the false contour, occurring when an input video of a lower bit depth is extended to an output video of a higher bit depth, since the false contour is detected, and smoothing is performed with respect to the detected false contour. Also, it is possible to improve accuracy when detecting a false contour by using a gradient and simplicity and to perform adaptive smoothing by recycling the gradient and the simplicity when detecting the false contour from an input video. The present invention can be effectively applied to a small-sized display such as a DMB player and a mobile phone, which require a smaller memory capacity and less complex calculations, since a gradient and simplicity between adjacent pixels are obtained via a simple arithmetical operation, and a result of smoothing is obtained via another simple arithmetical operation.

Descriptions regarding a method and an apparatus for verifying whether a pixel is included in a contour, and a method and an apparatus for calculating simplicity will be omitted since the descriptions are already described in FIGS. 1 through 12.

The method for detecting and removing a false contour according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to protect a detail area since the false contour is detected from an input video in advance, and the false contour is selectively removed by exclusively limiting the removal to only the false contour.

Also, according to the present invention, it is possible to precisely detect and remove a false contour since the false contour, which has occurred when an input video of a lower bit depth is extended to an output video of a higher bit depth, is detected, and smoothing is performed with respect to the detected false contour.

Also, according to the present invention, it is possible to improve accuracy when detecting a false contour by using a gradient and simplicity, and to perform adaptive smoothing by recycling the gradient and the simplicity when detecting the false contour from an input video.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method for detecting and removing a false contour, comprising:
   receiving an input video;
   verifying whether a pixel of the input video is included in a contour;
   calculating simplicity of the pixel, the calculating comprising calculating a numeric value by accumulating predetermined weighted values according a comparison of the pixel and adjacent pixels in either a longitudinal direction or a diagonal direction, the predetermined weighted values being determined prior to receiving the input video;
   determining whether the pixel is included in a false contour based on the simplicity and based on whether the pixel is included in the contour; and
   removing the false contour from the input video via smoothing with respect to the false contour,
   wherein the calculating of the simplicity of the pixel comprises:
      verifying whether a difference between the adjacent pixels within an n x n sized pixel group, including the pixel in a center thereof, is less than a predetermined difference;
      measuring a bond strength between the adjacent pixels according to directions of the adjacent pixels when the difference between the adjacent pixels is less than the predetermined difference; and
      calculating the simplicity of the pixel based on the bond strength.

2. The method of claim 1, wherein the verifying of whether the pixel of the input video is included in the contour comprises:
   calculating a gradient of each pixel; and
   determining whether the pixel is included in the contour based on the gradient.

3. The method of claim 2, wherein the calculating of the gradient of each pixel calculates the gradient using a nonlinear partial differential of an x axis and a nonlinear partial differential of a y axis, which correspond to the pixel, as below:

$$|G|=|Gx|+|Gy|,  \quad\quad\quad\quad \text{[Equation 5]}$$

where G indicates the gradient, Gx indicates the nonlinear partial differential of the x axis, and the Gy indicates the nonlinear partial differential of the y axis.

4. The method of claim 2, wherein the determining of whether the pixel is included in the contour based on the gradient determines the pixel is included in the contour when the gradient of the pixel is identical to a longitudinal value or a diagonal value according to a number of a bit loss.

5. The method of claim 2, wherein the verifying of whether the pixel of the input video is included in the contour further comprises:
   verifying whether a linked pixel to the pixel exists, and
   the determining of whether the pixel is included in the contour based on the gradient determines the pixel is included in the contour when the gradient of the pixel is identical to the longitudinal value or identical to the diagonal value according to the number of a bit loss and when the linked pixel exists.

6. A method for detecting and removing a false contour, comprising:
   verifying whether a pixel of an input video is included in a contour;
   calculating simplicity of the pixel, the calculating comprising calculating a numeric value by accumulating predetermined weighted values according a comparison of the pixel and adjacent pixels in either a longitudinal direction or a diagonal direction;

determining whether the pixel is included in a false contour based on the simplicity and based on whether the pixel is included in the contour; and removing the false contour from the input video via smoothing with respect to the false contour, wherein the calculating of the simplicity of the pixel comprises:

verifying whether a difference between the adjacent pixels within an n x n sized pixel group, including the pixel in a center thereof, is less than a predetermined difference;

measuring a bond strength between the adjacent pixels according to directions of the adjacent pixels when the difference between the adjacent pixels is less than the predetermined difference; and calculating the simplicity of the pixel based on the bond strength.

7. The method of claim 6, wherein the adjacent pixels comprise a predetermined pixel within the n x n sized pixel group and a nearest pixel existing in the longitudinal direction or the diagonal direction from the predetermined pixel, and the measuring of the bond strength between the adjacent pixels according to directions of the adjacent pixels measures a predetermined weighted value according to either the longitudinal direction or the diagonal direction between the adjacent pixels as the bond strength.

8. The method of claim 1, wherein the removing of the false contour from the input video via smoothing with respect to the false contour comprises:

determining a smoothing level based on simplicity and a gradient of the pixel and based on simplicity and a gradient of adjacent pixels; and removing the false contour according to the smoothing level.

9. The method of claim 8, wherein the removing of the false contour from the input video via smoothing with respect to the false contour removes the false contour with respect to the pixel and the adjacent pixels, using a single smoothing filter from predetermined smoothing filters shown in Equation 6, $$K_{7\times 7} = \frac{1}{49} = \begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$ [Equation 6]

$$K_{5\times 5} = \frac{1}{25} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

$$K_{3\times 3} = \frac{1}{9} = \begin{bmatrix} 1 & 1 & 1 \\ 1 & 1 & 1 \\ 1 & 1 & 1 \end{bmatrix},$$

according to the smoothing level.

10. A method of determining whether a pixel is included in a contour comprising:

calculating a gradient of each pixel of an input video;

verifying whether a linked pixel to the pixel exists, and determining whether the pixel is included in the contour based on the gradient and based on whether the linked pixel to the pixel exists;

wherein the calculating of the gradient of each pixel calculates the gradient using a nonlinear partial differential of an x axis and a nonlinear partial differential of a y axis, which correspond to the pixel, as below:

$$|G|=|Gx|+|Gy|,$$ [Equation 7]

where G indicates the gradient, Gx indicates the nonlinear partial differential of the x axis, and the Gy indicates the nonlinear partial differential of the y axis, wherein the nonlinear partial differential of the x axis, and the nonlinear partial differential of the y axis are calculated by applying a gradient mask to a 2×2 sized pixel group, including the pixel in a predetermined location, and the gradient mask includes an x mask and a y mask shown in Equation 8, $$xGMask = \begin{bmatrix} 1, & -1 \\ 2, & -1 \end{bmatrix},$$ [Equation 8]

$$yGMask = \begin{bmatrix} -1, & -2 \\ 1, & 2 \end{bmatrix},$$

where xGMask indicates a matrix expressing the x mask, and yGMask indicates a matrix expressing the y mask.

11. The method of claim 10, wherein the determining of whether the pixel is included in the contour based on the gradient and based on whether the linked pixel to the pixel exists determines the pixel is included in the contour when the gradient of the pixel is identical to a longitudinal value or identical to a diagonal value according to a number of a bit loss.

12. An apparatus of detecting and removing a false contour comprising one or more processors, comprising:

a contour verifying unit, controlled by the one or more processors, configured to receive an input video and verify whether a pixel of the input video is included in a contour;

a simplicity calculation unit, controlled by the one or more processors, configured to calculate simplicity of the pixel, the calculating comprising calculating a numeric value by accumulating predetermined weighted values according a comparison of the pixel and adjacent pixels in either a longitudinal direction or a diagonal direction, the predetermined weighted values being determined prior to receiving the input video;

a false contour determination unit, controlled by the one or more processors, configured to determine whether the pixel is included in a false contour based on the simplicity and based on whether the pixel is included in the contour; and a false contour removing unit, controlled by the one or more processors, configured to remove the false contour via smoothing from the input video with respect to the false contour, wherein the simplicity calculation unit comprises:

a pixel difference verifying unit, controlled by the one or more processors, configured to verify whether a difference between adjacent pixels within an n x n sized pixel group, including the pixel in a center thereof, is less than a predetermined difference;
a bond strength measurement unit, controlled by the one or more processors, configured to measure a bond strength between the adjacent pixels according to directions of the adjacent pixels when the difference between the adjacent pixels is less than the predetermined difference; and
a calculation unit, controlled by the one or more processors, configured to calculate the simplicity of the pixel based on the bond strength.

13. The apparatus of claim 12, wherein the contour verifying unit comprises:
a gradient calculation unit, controlled by the one or more processors, configured to calculate a gradient of each pixel; and
a contour determination unit, controlled by the one or more processors, configured to determine whether the pixel is included in the contour based on the gradient.

14. The apparatus of claim 12, wherein the false contour removing unit comprises:
a smoothing level determination unit, controlled by the one or more processors, configured to determine a smoothing level based on simplicity and a gradient of the pixel and based on simplicity and a gradient of the adjacent pixels; and
a smoothing unit, controlled by the one or more processors, configured to remove the false contour according to the smoothing level.

15. An apparatus of determining a contour, comprising:
a gradient calculation unit, controlled by the one or more processors, configured to calculate a gradient of each pixel of an input video;
a linked pixel verifying unit, controlled by the one or more processors, configured to verify whether a linked pixel of the pixel exists; and
a contour determination unit, controlled by the one or more processors, configured to determine whether the pixel is included in the contour based on the gradient and based on whether the linked pixel exists,
wherein the gradient calculation unit calculates the gradient using a nonlinear partial differential of an x axis and a nonlinear partial differential of a y axis, which correspond to the pixel, as below:

$$|G|=|Gx|+|Gy|, \quad \text{[Equation 9]}$$

where G indicates the gradient, Gx indicates the nonlinear partial differential of the x axis, and the Gy indicates the nonlinear partial differential of the y axis,
wherein the nonlinear partial differential of the x axis and the nonlinear partial differential of the y axis are calculated by applying a gradient mask to a 2×2 sized pixel group, including the pixel in a predetermined location, and the gradient mask includes an x mask and a y mask shown in Equation 10, $$xGMask = \begin{bmatrix} 1, & -1 \\ 2, & -1 \end{bmatrix}, \quad \text{[Equation 10]}$$
$$yGMask = \begin{bmatrix} -1, & -2 \\ 1, & 2 \end{bmatrix},$$

where xGMask indicates a matrix expressing the x mask, and yGMask indicates a matrix expressing the y mask.

\* \* \* \* \*